United States Patent [19]

Lee

[11] Patent Number: 5,701,980
[45] Date of Patent: Dec. 30, 1997

[54] POWER SUPPLY DEVICE FOR AN ELECTROMOTIVE RAILCAR

[75] Inventor: Won Ki Lee, Anyang-si, Rep. of Korea

[73] Assignee: Daewoo Heavy Industries Ltd., Incheon, Rep. of Korea

[21] Appl. No.: 662,157

[22] Filed: Jun. 12, 1996

[30] Foreign Application Priority Data

Jun. 13, 1995 [KR] Rep. of Korea ............ 95-13336(U.M.)
Jun. 11, 1996 [KR] Rep. of Korea ................ 96-20852

[51] Int. Cl.[6] .................................................. B60L 1/00
[52] U.S. Cl. ............................. 191/4; 307/66; 307/86
[58] Field of Search ................................. 191/2, 3, 4, 5, 191/8; 307/9.1, 69, 66, 64, 80, 85, 86, 87

[56] References Cited

U.S. PATENT DOCUMENTS

| | | | |
|---|---|---|---|
| 3,547,237 | 12/1970 | Ives | 191/4 |
| 4,795,859 | 1/1989 | Kato et al. | 191/4 |
| 5,579,197 | 11/1996 | Mengelt et al. | 307/66 |

FOREIGN PATENT DOCUMENTS 386812  9/1990  European Pat. Off. ............ 191/4

*Primary Examiner*—Mark T. Le
*Attorney, Agent, or Firm*—Staas & Halsey

[57] ABSTRACT

A power supply device for an electromotive railcar is adapted to receive external current from an overhead electric line via a pantograph and to feed driving current of lower voltage than the external current to electric loads in the railcar through first and second current output lines. The power supply device is provided with a static inverter couplable to the overhead electric line through first and second input lines and capable of producing the driving current. A battery is connected to the static inverter in parallel with the loads for selectively charging the driving current and discharging the charged electric current to the loads. An anti-discharge switch is provided on the first current output line for selectively connecting and disconnecting the loads to and from the battery. A discharge controller coacts with the anti-discharge switch for allowing the anti-discharge switch to be closed when no external current is fed to the static inverter and for causing the anti-discharge switch to become open when the static inverter receives the external current from the overhead electric line. In addition, the power supply device includes an emergency switch manually operable and in cooperation with the discharge controller for causing the anti-discharge switch to be closed so that the electric current stored in the battery is fed to the loads at the time the static inverter delivers no driving current to the loads.

6 Claims, 2 Drawing Sheets

POWER SUPPLY DEVICE FOR AN ELECTROMOTIVE RAILCAR

FIELD OF THE INVENTION

The present invention is generally concerned with an electromotive railcar moving along a railway with the electric energy supplied from an overhead electric line and, more particularly, with a power supply device built in the electromotive railcar to provide interface between the overhead electric line and a variety of electric loads in the railcar.

DESCRIPTION OF THE PRIOR ART

It is a matter of public knowledge in the rolling stock field that an electromotive railcar, as distinguished from an engine traction car, relies on an electric traction motor in moving along a track or railway, the traction motor supplied with external electric current of high voltage, e.g., alternating current of 25000V or direct current of 1500V, from an overhead electric line which remains suspended over the roof of the railcar. To receive the external electric current flowing through the overhead electric line, the electromotive rail car is provided on the roof thereof with a pantograph that can be raised up into contact with the overhead electric line to enable the external electric current to be fed to the traction motor and like electric loads throughout the in-service process of the railcar. As the railcar is put out of service for the day, the pantograph should be lowered down out of contact with the overhead electric line so that no external electric current may be applied to the railcar until the latter resumes its operation early in the morning. There may be other instances where the pantograph has to be lowed down. In the event that the railcar should fail on the way of normal service, for example, it would be necessary to have the pantograph lowered for safe maintenance or emergency traction of the rail car.

During the time the pantograph remains in contact with the overhead electric line, the high voltage external current flowing through the latter is fed to an auxiliary power supply unit in the railcar, i.e., static inverter, which in turn converts the high voltage external current into alternating driving current of, e.g., 380V. As used in the description and the claims, the terminology "static inverter" is intended to include a voltage transformer and should be construed in its broadest meaning. A part of the driving current produced from the static inverter will be stored or charged in a battery for later use, with the remainder consumed in such electric loads as a traction motor, a compressor motor, a heater, an air conditioner, illumination lamps, photoelectric display boards and the like. The electric current stored in the battery may be used to drive the compressor motor and to light up emergency lamps in case where the pantograph is lowered down to disconnect the static inverter from the overhead electric line and thus the static inverter do not generate any internal driving current. Particularly, the compressor motor is operable with the electric current fed from the battery, when no driving current is available from the static inverter, to thereby drive an air compressor which generates pressurized air to be used in raising or lowering the pantograph. Since the battery in an electromotive railcar plays key role in supplying electric current to the electric loads during the period of the external current being cut off, care should be taken not to cause any overdischarge and hence fatal damage of the battery before and after the railcar is put in service.

Nevertheless, when the railcar is to be out of service for the day, there occurs not infrequently such instances where the operator or driver leave the railcar without turning off the power switch, either mistakenly or intentionally for the purpose of shortening the warming-up time in the next morning. In this case, the external electric current will usually continue to be fed to the railcar from the overhead electric line because the pantogragh would remain in contact with the overhead electric line. In the event that the power supply from the overhead electric line is suspended or interuppted for whatever reason, however, the static inverter fails to generate any internal driving current whereby the battery ceases to perform its charging action but, instead, begins to discharge the electric current stored therein to the loads. Should the power supply suspension last for an extended period of time under the condition noted above, the battery is doomed to overdischarge its electric current and, at last, would loose its functions in their entirety. Replacing the "dead" battery with a new one is not only time-consuming and costly but also significantly delays the time schedule for the railcar to be put in service.

SUMMARY OF THE INVENTION

Accordingly, it is an object of the invention to provide a power supply device for an electromotive railcar which has the ability to inhibit a battery built in the railcar fore overdischarge in the event that, while a power switch remains turned on, the external electricity will not be fed from an overhead electric line to loads in the railcar.

Another object of the invention is to provided a power supply device for an electromotive railcar which can detach electric loads from battery when an overhead electric line is in suspension of electricity supply and which makes it possible to have the electric loads recoupled to the battery when the electromotive railcar is hauled by an engine railcar for emergency rescue operation.

With these objects in view, the present invention provides a power supply device for an electromotive railcar adapted to receive external current from an overhead electric line via a pantograph and to feed driving current of lower voltage than the external current to electric loads in the railcar through first and second current output lines, comprising: a static inverter couplable to said overhead electric line through first and second input lines and capable of producing the driving current; a battery connected to said static inverter in parallel with said loads for selectively charging the driving current and discharging the charged electric current to said loads; anti-discharge switch means provided on said first current output line for selectively connecting and disconnecting said loads to and from said battery; discharge control means in cooperative association with said anti-discharge switch means for allowing said anti-discharge switch means to be open when no external current is fed to said static inverter and for causing said anti-discharge switch means to become closed when said static inverter receives the external current from said overhead electric line; and emergency switch means manually operable and in cooperation with said discharge control means for causing said anti-discharge switch means to be closed so that the electric current stored in said battery is fed to said loads at the time said static inverter delivers no driving current to said loads.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
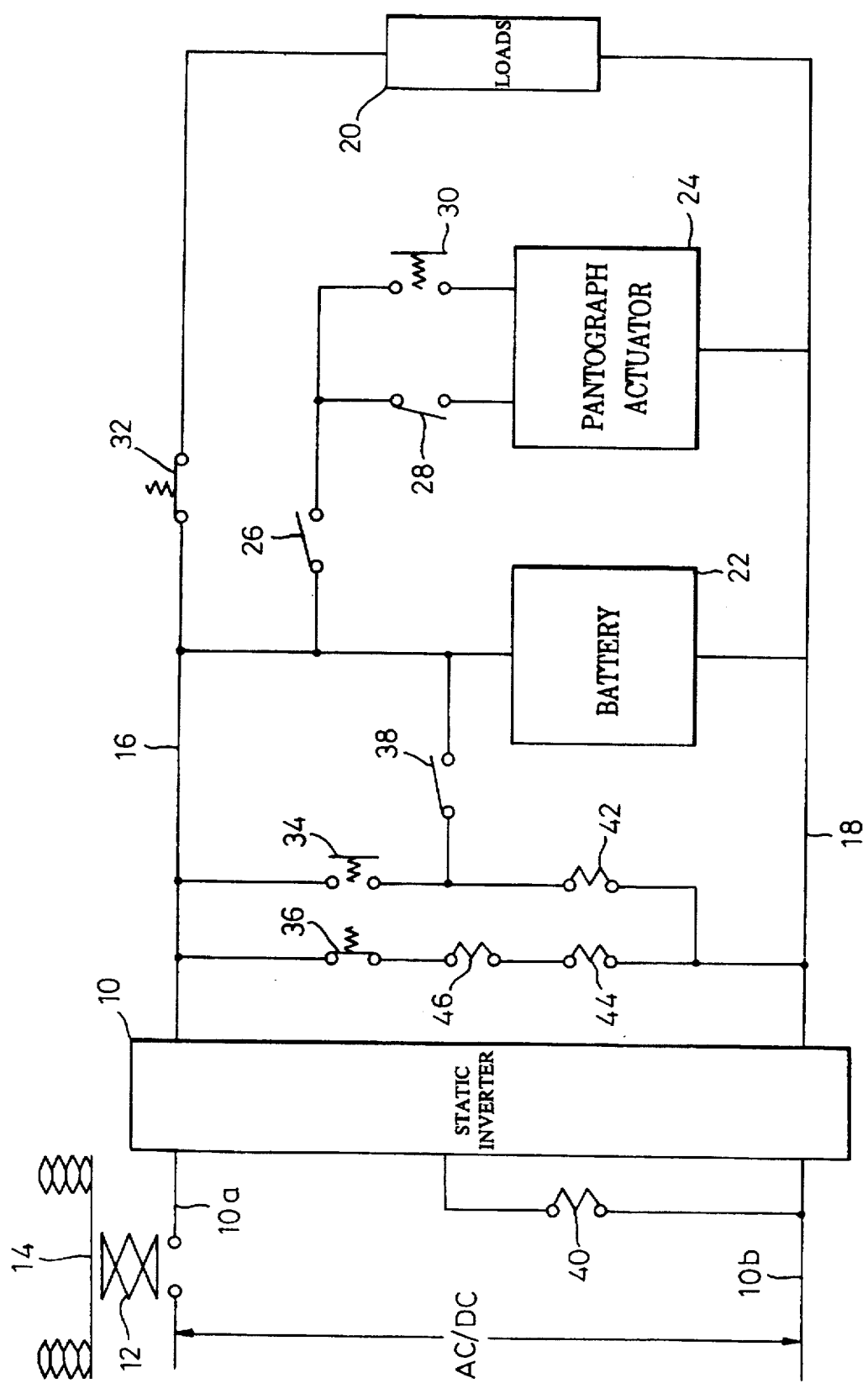
FIG. 1 is an electric circuit diagram showing the power supply device for an electromotive railcar in accordance with the preferred embodiment of the invention.

Referring now to FIG. 1, it can be seen that the power supply device for an electromotive railcar embodying the present invention is provided with a static inverter 10 that receives external electric current of high voltage via a pantograph 12 which may be either raised up into contact with an overhead electric line 14 or lowered down out of contact with the latter. The external current fed through first and second input lines 10a, 10b, usually, AC 25000V or DC 1500V, is transformed into driving current of, e.g., AC 380V, in the static inverter 10. A part of the driving current that the static inverter 10 produces will be delivered to a variety of electric loads 20 via first and second current output lines 16, 18, while the remainder of the driving current will be charged or stored in a battery 22 which is connected to the first and second current output lines 16, 18 in parallel with the loads 20. Typical examples of the loads 20 include a traction motor, a compressor motor, an air conditioner, a heater, illumination lamps and relays. Although not shown in the drawings for simplicity, the battery 22 may have a built-in conversion device whereby the alternating driving current is converted to a direct current and vice versa.

A pantograph actuator 24 is connected to the battery 22 by way of a power switch 26, a panto-up switch 28 and a panto-down switch 30. The pantograph actuator 24 serves to, when energized, selectively raise up the pantograph 12 into contact with the overhead electric line 14 and to lower down it out of contact with the overhead electric line 14. In the illustrated embodiment, the power switch 26 and the panto-up switch 28 are manually operable by the railcar driver, whereas the panto-down switch 30 is an electromagnetic switch normally remaining open and automatically closed when the external current is no longer fed to the static inverter 10. Located on the first current output line 16 is an anti-discharge timer relay switch 32 which remains closed normally and made open in case the static inverter 10 fails to receive the external current from the overhead electric line 14.

In between the first and second output lines 16, 18, a normally open, main relay switch 34 and a normally closed, auxiliary relay switch 36 are provided in parallel with each other so that they may be activated in the opposite direction. The main relay switch 34 is coupled to the battery 22 through a manually operated emergency switch 38 that, when closed, will cause the anti-discharge timer relay switch 32 to be kept closed.

It can be further appreciated that a main relay 40 is connected at one end to the static inverter 10 and at the other end to the second current input line 10b. The main relay 40 will remain non-excited to maintain the main relay switch 34 open in the case of the static inverter 10 being supplied with no external current, but will get excited or tripped to close the main relay switch 34 upon supply of the external current to the static inverter 10. An auxiliary relay 42 is connected at one end both to the main relay switch 34 and the manual emergency switch 38 and at the other end to the second output line 18. The auxiliary relay 42 will become excited in response to the main relay switch 34 being closed by the excitation of the main relay 40. At the time the main relay switch 34 is made open, the auxiliary relay 42 will be kept non-excited, thus rendering the auxiliary relay switch 36 closed.

Meanwhile, a timer relay 44 and a panto-down relay 46 are serially connected to the auxiliary relay switch 36, with the timer relay 44 also coupled to the auxiliary relay 42. As its name implies, the timer relay 44 is operable to be excited with a time delay of, e.g., about eight minutes, when the auxiliary relay switch 36 is in a closed position, although it remains non-excited as long as the auxiliary relay switch 36 is in an open position. Excitation of the timer relay 44 will bring the anti-discharge timer relay switch 32 into an open position to thereby prohibit the battery 22 from supplying electric current to the loads 20. Electric current will be allowed to flow through the timer relay switch 32 during the period of non-excitation of the timer relay 44. On the other hand, the panto-down relay 46 remains non-excited to leave the panto-down relay switch 30 open when the auxiliary relay switch 36 is in the open position. If the auxiliary relay switch 36 is in the closed postion, however, the panto-down relay 46 will be subjected to excitation to have the panto-down relay switch 30 closed such that the pantograph actuator 24 may be caused to lower down the pantograph 12. As used herein, the terms "panto-up" and "panto-down" are respectively a shortened version of pantegraph-up and pantograph-down.

Figure 2:
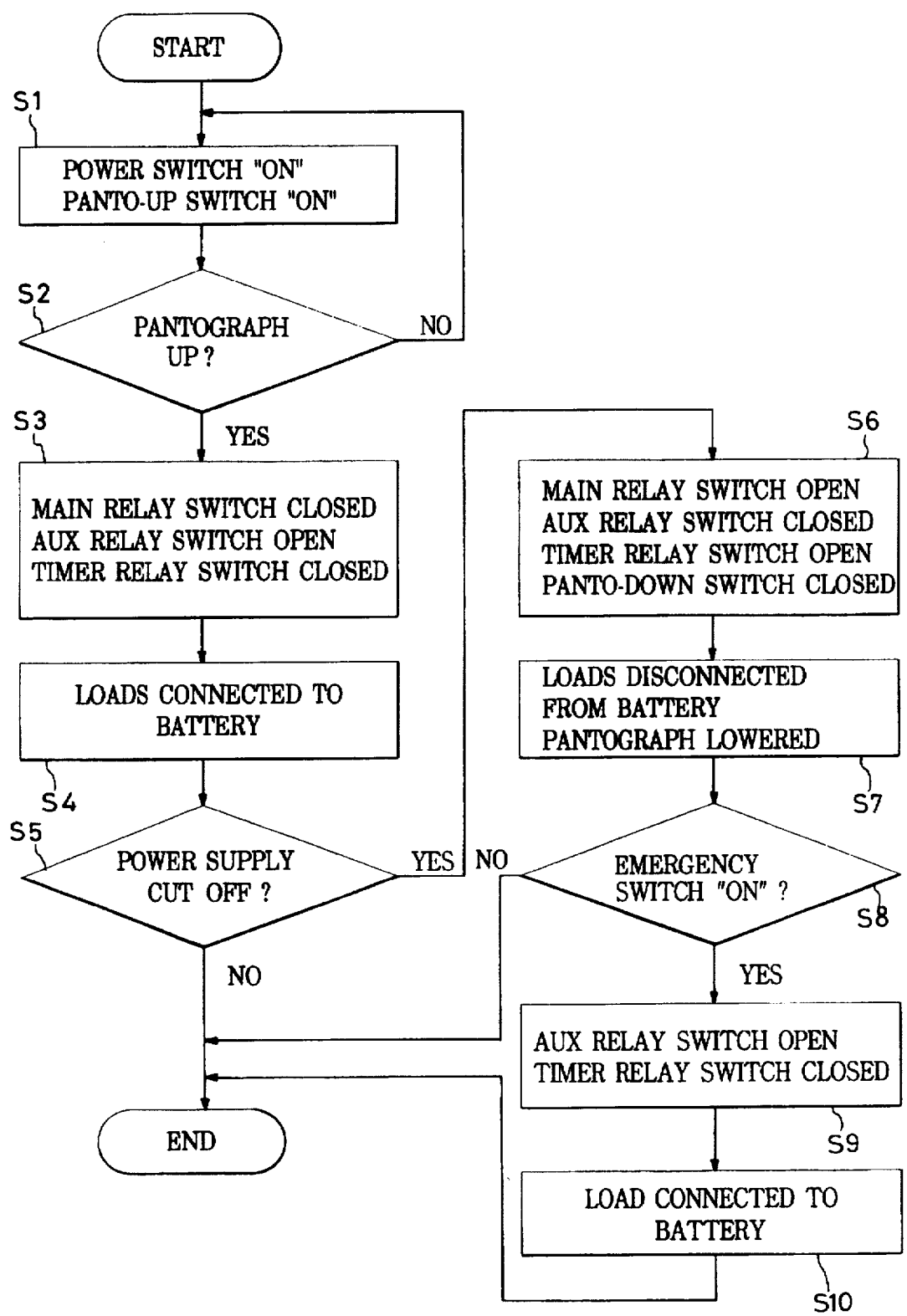
FIG. 2 is a flow chart representing the operation of the power supply device illustrated in FIG. 1.

With reference to FIGS. 1 and 2, description will be offered in the following as to the operation of the power supply device in accordance with the invention. In step 1, the power switch 26 and the panto-up switch 28 are turned on whereby the pantegraph actuator 24 will be supplied with electric current from the battery 22 to raise up the pantograph 12 in contact with the overhead electric line 14. In step 2, determination is made to make sure whether the pantograph 12 has reached the raised position. Step 1 will be repeated if the pantograph 12 is determined to be still in the lowered position or otherwise step 3 is to be carded out.

In step 3, the main relay switch 34 and the anti-discharge timer relay switch 32 will be closed while the auxiliary relay switch 36 will be put into an open position. More specifically, as the external current is supplied to the static inverter 10 upon the pantograph 12 reaching the raised position, the main relay 40 become excited to bring the main relay switch 34 into a closed position, in response to which the auxiliary relay 42 is subjected to excitation to render the auxiliary relay switch 36 open. This will assure that the timer relay 44 becomes inoperative to leave the timer relay switch 32 closed. Should the timer relay switch 32 be in the closed position, electric connection will be established between the loads 20 and the battery 22. The result is that the battery 22 is charged with the driving current fed from the static inverter 10, while the loads is driven by the driving current.

In step 5, the main relay 40 is used to detect whether the external electric power continues to be supplied to the static inverter 10 from the overhead electric line 14, that is to say, if any electricity interruption has occured in the overhead electric line 14. Should such be not the case, then all the process comes to an end. Step 6 is performed when the electricity interruption has taken place. In step 6, the main relay 40 does not work due to the lack of electricity supply, thus causing the main relay switch 34 to be in the open position whereby the auxiliary relay 42 will get inoperative. As a result, the auxiliary relay switch 36 is brought into a closed position, which will excite the timer relay 44 and the panto-down relay 46 so that the timer relay switch 32 can be shifted to its open position, with the panto-down relay switch 30 closed. It should be preferred that the timer relay 44 is activated with a time delay of eight minutes, for instance, to make sure that the electricity interruption in the overhead electric line 14 is long-lasting and not a matter of a few seconds. Responsive to such activation of the timer relay switch 32 and the panto-down relay switch 30, in step 7, the loads 20 will be disconnected from the battery 22 and, at the same time, the pantograph 12 will be lowered down out of contact with the overhead electric line 14. This would make it possible to positively inhibit the battery from unwanted overdischarge and resultant damage even though long-lasting power interruption takes place in the absence of the railcar driver.

In case where the electromotive railcar is to be hauled into a safety zone by use of a typical engine railcar, viz., at the time of emergency rescue operation, there will arise a need to recouple the loads 20 to the battery 22 for the sake of turning on emergency lights and making a brake system operative. To do this, the emergancy switch 38 has to be closed manually, the activation of which is determined in step 8. If the emergency switch 38 remains open, step 8 should be passed to the end step. On the contray, if the emergency switch 38 is determined to have been closed, step 9 proceeds wherein the auxiliary relay 42 will be re-excited as in step 3 but by virtue of the electric current supplied from the battery 22. This will bring the auxiliary relay switch 36 into the open position, which in turn deactivates the timer relay 44 to allow the timer relay switch 32 to be kept in the normal, closed position. In this way, the loads 20 is recoupled to the battery 22 to enable the electric current stored in the battery to be available in the emergency rescue operation.

While the invention has been shown and described with reference to a preferred embodiment, it should be apparent to one of ordinary skill in the art that many changes and modifications may be made without departing from the spirit and scope of the invention as defined in the claims.

What is claimed is:

1. A power supply device for an electromotive railcar adapted to receive external current from an overhead electric line via a pantograph and to feed driving current of lower voltage than the external current to electric loads in the railcar through first and second current output lines, comprising:

a static inverter couplable to said overhead electric line through first and second input lines and capable of producing the driving current;

a battery connected to said static inverter in parallel with said loads for selectively charging the driving current and discharging the charged electric current to said loads;

anti-discharge switch means provided on said first current output line for selectively connecting and disconnecting said loads to and from said battery;

discharge control means in cooperative association with said anti-discharge switch means for allowing said anti-discharge switch means to be open when no external current is fed to said static inverter and for causing said anti-discharge switch means to become closed when said static inverter receives the external current from said overhead electric line; and emergency switch means manually operable and in cooperation with said discharge control means for causing said anti-discharge switch means to be closed so that the electric current stored in said battery is fed to said loads at the time said static inverter delivers no driving current to said loads.

2. The power supply device for an electromotive railcar as recited in 1, wherein said discharge control means comprises a first, normally open, relay switch connected to said first and second current output lines between said static inverter and said battery, a second, normally closed, relay switch located in parallel with said first relay switch, a first relay for detecting the external current to cause said first relay switch to be open when no external current is supplied to said static inverter, a second relay for causing said second relay switch to be closed as said first relay switch is rendered open and a third relay for causing said anti-discharge switch means to disconnect said loads from said battery when said second relay switch is closed.

3. The power supply device for an electromotive railcar as recited in claim 2, wherein said anti-discharge switch means is a normally closed relay switch openable when said third relay becomes excited.

4. The power supply device for an electromotive railcar as recited in claim 2, further comprising a pantograph actuator coupled to said battery via a manually operated power supply switch, a manually operated panto-up switch and a normally open, panto-down relay switch.

5. The power supply device for an electromotive railcar as recited in claim 4, further comprising a fourth relay for causing said panto-down relay switch to be closed, when said static inverter fails to receive the external current from said overhead electric line, so that said pantograph actuator is activated to lower down said pantograph out of contact with said overhead electric line.

6. The power supply device for an electromotive railcar as recited in claim 2, wherein said emergency switch means is connected between said battery and said second relay for, when closed, allowing the electric current stored in said battery to be fed to said second relay.

* * * * *